(12) United States Patent
Babcock et al.

(10) Patent No.: US 11,411,836 B1
(45) Date of Patent: *Aug. 9, 2022

(54) SYSTEMS AND METHODS FOR VISUAL PRESENTATION OF DATA

(71) Applicant: United Services Automobile Association (USAA), San Antonio, TX (US)

(72) Inventors: Peter Steuart Babcock, Helotes, TX (US); Benjamin Charles Henry, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/192,159

(22) Filed: Mar. 4, 2021

Related U.S. Application Data

(63) Continuation of application No. 15/923,709, filed on Mar. 16, 2018, now Pat. No. 10,944,642.

(60) Provisional application No. 62/482,244, filed on Apr. 6, 2017.

(51) Int. Cl.
*H04L 41/22* (2022.01)
*G06T 11/20* (2006.01)

(52) U.S. Cl.
CPC ........... *H04L 41/22* (2013.01); *G06T 11/206* (2013.01)

(58) Field of Classification Search
CPC .............................. H04L 41/22; G06T 11/206
USPC ........................................................ 715/736
See application file for complete search history.

(56) References Cited

U.S. PATENT DOCUMENTS

| | | | | |
|---|---|---|---|---|
| 4,674,043 A | * | 6/1987 | Hernandez | G06F 40/18 715/209 |
| 5,461,708 A | * | 10/1995 | Kahn | G06F 40/18 345/440 |
| 6,118,427 A | | 9/2000 | Buxton et al. | |
| 6,211,887 B1 | * | 4/2001 | Meier | G06F 40/18 345/440 |
| 7,231,668 B2 | * | 6/2007 | Jacobson | H04L 29/06 726/22 |

(Continued)

OTHER PUBLICATIONS

Saary, M. Joan. "Radar Plots: a Useful Way for Presenting Multivariate Health Care Data." Journal of Clinical Epidemiology, vol. 61, No. 4, 2008, pp. 311-317., doi: 10.1016/j.jclinepi.2007.04.021. (Year: 2008).

*Primary Examiner* — Stephen S Hong
*Assistant Examiner* — Broderick C Anderson
(74) *Attorney, Agent, or Firm* — Fletcher Yoder, P.C.

(57) ABSTRACT

Embodiments described herein enable a receipt of a first input representative of a risk score for a data type and a plurality of second inputs representative of a plurality of a plurality of setting evaluations of a network-based application; and a presentation of a first polygonal shape based on the first input, a plurality of second polygonal shapes, and a third polygonal shape based on the second inputs such that the first polygonal shape and the second polygonal shapes are concentric with each other and such that the first polygonal shape and the third polygonal shape are presented over the second polygonal shapes. The presentation enables a user to readily visualize a set of areas where the first polygonal shape and the third polygonal shape differ in order to determine how the network-based application is compliant and non-compliant with the first input.

19 Claims, 14 Drawing Sheets

(56) References Cited

U.S. PATENT DOCUMENTS

| | | | |
|---|---|---|---|
| 7,268,782 B2* | 9/2007 | Ebert | G06Q 10/06 |
| | | | 345/440 |
| 9,213,624 B2 | 12/2015 | Nair et al. | |
| 2004/0070624 A1* | 4/2004 | Fushimi | G06F 16/248 |
| | | | 715/771 |
| 2011/0112891 A1* | 5/2011 | Alber | G06Q 10/06398 |
| | | | 705/7.42 |
| 2011/0115795 A1 | 5/2011 | Koch et al. | |
| 2015/0324101 A1 | 11/2015 | Roesch et al. | |
| 2015/0330872 A1* | 11/2015 | Habibi | G07C 3/00 |
| | | | 702/182 |
| 2019/0011899 A1* | 1/2019 | Vartak | G05B 19/409 |
| 2019/0172016 A1 | 6/2019 | Chaudhri et al. | |

\* cited by examiner

Category Breakdown

| Data Security | 1 | 2 | 3 | 4 | 5 |
|---|---|---|---|---|---|
| Activity Monitoring | | | | | |
| Data Classification | | | | | |
| Data Loss Prevention | | | | | |
| Multi-Tenancy | | | | | |
| Records Management | | | | | |
| Overall Risk Score | | | 3.2 | | |

| Vendor Management | 1 | 2 | 3 | 4 | 5 |
|---|---|---|---|---|---|
| SaaS Personal | | | | | |
| Supply Chain Mgmt | | | | | |
| Third Party Assess | | | | | |
| Vendor IAM Program | | | | | |
| Direct Damage Liab. | | | | | |
| Overall Risk Score | | | 4.4 | | |

| Encryption | 1 | 2 | 3 | 4 | 5 |
|---|---|---|---|---|---|
| Certificate Management | | | | | |
| Encryption at Rest | | | | | |
| Encryption in Motion | | | | | |
| Key Management | | | | | |
| Overall Risk Score | | | 3.8 | | |

| Incident Mgmt | 1 | 2 | 3 | 4 | 5 |
|---|---|---|---|---|---|
| Incident Response | | | | | |
| Forensics | | | | | |
| Logging | | | | | |
| Monitoring & Alerting | | | | | |
| Overall Risk Score | | | 3.8 | | |

FIG. 4

| Category | Sub-Concern | Score | 0 - None | 1 - Initial | 2 - Developing | 3 - Defined | 4 - Managed | 5 - Optimized |
|---|---|---|---|---|---|---|---|---|
| Application Security | Code Assessments | | Unknown | The SaaS Vendor must have a Software Development Life Cycle (SDLC) Process that includes: - Security-focused code reviews | The SaaS Vendor must have a Software Development Life Cycle (SDLC) Process that includes: - Annual Dynamic Application Security Testing (DAST) | The SaaS Vendor must have a Secure-SDLC process that includes: - Regular Static Application Security Testing (SAST) - High level reporting to USAA of the SaaS Vendor's assessment activities | The SaaS Vendor must have an S-SDLC process that includes: - Major release driven, risk-based application security assessments including: threat modeling, SAST, DAST | The SaaS Vendor must have an S-SDLC process that includes: - Major release driven, risk-based application security assessments including: abuse case unit testing |
| Application Security | Penetration Testing | | Unknown | No formalized penetration testing program. | The SaaS Vendor has conducted application penetration testing. | The SaaS Vendor must conduct annual application penetration testing and provide high level reports to USAA. | The SaaS Vendor must conduct application penetration tests, based on risk, on every major version release. The SaaS Vendor must use a recognized independent third party penetration testing firm. | The SaaS Vendor must staff an Application-focused red team to conduct regular application penetration tests. |
| Application Security | Training | | Unknown | The SaaS Vendor must provide developers with basic application security awareness. | The SaaS Vendor must ensure that its application developers complete application security training. | The SaaS Vendor must ensure that its application developers complete annual application security training. | The SaaS Vendor must ensure that its application developers complete targeted application security training based on supported languages and platforms. | The SaaS Vendor must invest in industry recognized application security training and certifications for developers. |

FIG. 5

SYSTEMS AND METHODS FOR VISUAL PRESENTATION OF DATA

CROSS REFERENCE TO RELATED APPLICATIONS

This application is a continuation of U.S. patent application Ser. No. 15/923,709, entitled "SYSTEMS AND METHODS FOR VISUAL PRESENTATION OF DATA," filed Mar. 16, 2018, which claims priority to U.S. Provisional Patent Application Ser. No. 62/482,244, entitled "SYSTEMS AND METHODS FOR VISUAL PRESENTATION OF DATA," filed Apr. 6, 2017, which is hereby incorporated by reference in its entirety.

TECHNICAL FIELD

Generally, this disclosure relates to computing. More particularly, this disclosure relates to visual presentation of data and specially-designed graphical user interfaces.

BACKGROUND

As the processing power of computers allow for greater computer functionality and the Internet technology era allows for interconnectivity between computing systems, companies are more reliant on third-party software. Consequently, an IT department for a typical company may encounter multiple third-party applications to provide different (or sometimes the same) products and/or services. For example, a company may utilize two or more third-party applications (e.g., application from different vendors) for data encryption, maintaining a webserver, maintaining the facade of a website, among others. However, relying on third-party applications has also made monitoring and ensuring data security more difficult. Current application and software monitoring/evaluating methods are not effective. For example, currently, IT personnel must review multiple spreadsheets in order to monitor compliance of each application with internal guidelines and standards. This method has been proven ineffective and inefficient because it is highly dependent upon each IT personnel's subjective knowledge. Furthermore, reviewing multiple spreadsheets is time-consuming, tedious, and error-prone. Yet further, reviewing compliance spreadsheets requires the end user to be familiar with complex programming, complex coding algorithms, and computer-implemented security protocols, which creates an undesirable user experience by shifting at least some of the burden onto the end user. This task has been proven difficult because most employees have little or no software programming knowledge. As a result, conventional security compliance monitoring systems and software solutions do not provide a desirable user experience (UX) and are cannot be easily utilized by end users with little to no programming experience.

SUMMARY

For the aforementioned reasons, there is a need for an accurate, effective, and efficient computer-implemented system and method for dynamically generating special graphical user interfaces that are configured to convey complex software security data for an end-user with a minimal knowledge of programming. The methods and systems disclosed herein, at least partially, address at least one of the above-mentioned inefficiencies. However, the methods and systems disclosed herein can prove useful to other technical areas, as well. Therefore, various claims recited below should not be construed as necessarily limited to addressing any of the above inefficiencies.

The embodiments described herein enable a graphical user interface (GUI) to depict how a set of data points associated with a technical configuration, such as a hosted application served via a software as a service (SaaS) server, visually compares to a threshold associated with a model for a set of technical configurations. In particular, the set of data points, such as decimal or whole values, represent a set of evaluations of the technical configuration and are received from a user input device, such as a keyboard. The threshold, such as a decimal or whole value, represents a score from the model for a set of technical configurations and is received from the user input device. The set of data points is depicted as a first polygonal shape extending over a set of concentric polygonal shapes, whether uniformly or non-uniformly, with a set of vertices of the first polygonal shape corresponding to the set of data points. The concentric polygonal shapes define a concentrically graduated scale. The data point is depicted as a second polygonal shape uniformly extending over the set of concentric polygonal shapes. The first polygonal shape, the second polygonal shape, and the set of concentric polygonal shapes are visually distinct from each other. As such, a user can readily determine a set of areas on the concentrically graduated scale, where the set of data points is at the threshold, above the threshold, and below the threshold in order to determine whether the technical configuration meets the threshold, is above the threshold, and below the threshold.

Even though some aspects of the embodiments described herein are described in the context of SaaS, the methods and systems described herein are not limited to SaaS and are applicable to any software program.

In an embodiment, a method of displaying a graphical user interface representing network-based application compliance data, the method comprises displaying, by a processor on a client computing device, a first graphical user interface comprising at least one interactive input component configured to receive network-based application compliance data; upon displaying the first graphical user interface, receiving, by the processor from the client computing device, network-based application compliance data comprising at least a first input corresponding to a compliance threshold score for a data type; displaying, by the processor on the client computing device, a second graphical user interface comprising at least a first polygonal shape over a graph depicting a plurality of second polygonal shapes such that the first polygonal shape is concentric to the plurality of second polygonal shapes, wherein the first polygonal shape includes a plurality of first vertices representative of a plurality of thresholds for the data type, wherein the second polygonal shapes include a plurality of second vertices representative of the first input, wherein the plurality of first vertices uniformly extend toward the plurality of second vertices based on the first input; receiving, by the processor, a plurality of second inputs representative of a plurality of evaluations of the network-based application; displaying, by the processor on the second graphical user interface, a third polygonal shape over the first polygonal shape, wherein the third polygonal shape includes a plurality of third vertices representative of the plurality of setting evaluations, wherein the third polygonal shape is visually distinct from the first polygonal shape and the second polygonal shapes, wherein the plurality of third vertices extend toward the plurality of second vertices based on each second input.

In another embodiment, a computer system for displaying a graphical user interface representing software compliance data, the computer system comprises a client computing device configured to display a plurality of graphical user interfaces; and a server communicatively coupled with the client computing device, wherein the server is configured to display, on the client computing device, a first graphical user interface comprising at least one interactive input component configured to receive network-based application compliance data; upon displaying the first graphical user interface, receive, from the client computing device, network-based application compliance data comprising at least a first input corresponding to a compliance threshold score for a data type; display, on the client computing device, a second graphical user interface comprising at least a first polygonal shape over a graph depicting a plurality of second polygonal shapes such that the first polygonal shape is concentric to the plurality of second polygonal shapes, wherein the first polygonal shape includes a plurality of first vertices representative of a plurality of thresholds for the data type, wherein the second polygonal shapes include a plurality of second vertices representative of the first input, wherein the plurality of first vertices uniformly extend toward the plurality of second vertices based on the first input; receive a plurality of second inputs representative of a plurality of evaluations of the network-based application; display, on the second graphical user interface, a third polygonal shape over the first polygonal shape, wherein the third polygonal shape includes a plurality of third vertices representative of the plurality of setting evaluations, wherein the third polygonal shape is visually distinct from the first polygonal shape and the second polygonal shapes, wherein the plurality of third vertices extend toward the plurality of second vertices based on each second input; display, on the second graphical user interface, a third polygonal shape over the first polygonal shape, wherein the third polygonal shape includes a plurality of third vertices representative of the plurality of setting evaluations, wherein the third polygonal shape is visually distinct from the first polygonal shape and the second polygonal shapes, wherein the plurality of third vertices extend toward the plurality of second vertices based on the plurality of second inputs.

This disclosure is embodied in various forms illustrated in a set of accompanying illustrative drawings. Note that variations are contemplated as being a part of this disclosure, limited only by a scope of various claims recited below.

BRIEF DESCRIPTION OF DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

FIG. 4 illustrates a screenshot of an embodiment of a GUI page depicting a plurality of tabular portions, each of the tabular portions containing a plurality of cells, each of the cells is color coded based on a graphical portion depicting a third polygonal shape being formed based on a plurality of third input values and depicted over the concentric polygonal shapes according to an embodiment.

FIG. 5 illustrates an interactive graphical user interface configured to receive inputs regarding one or more software programs according to an embodiment.

DETAILED DESCRIPTION

This disclosure is now described more fully with reference to the set of accompanying drawings, in which some example embodiments of this disclosure are shown. This disclosure may, however, be embodied in many different forms and should not be construed as necessarily being limited to the example embodiments disclosed herein. Rather, these example embodiments are provided so that this disclosure is thorough and complete, and fully conveys various concepts of this disclosure to skilled artisans.

Figure 1:
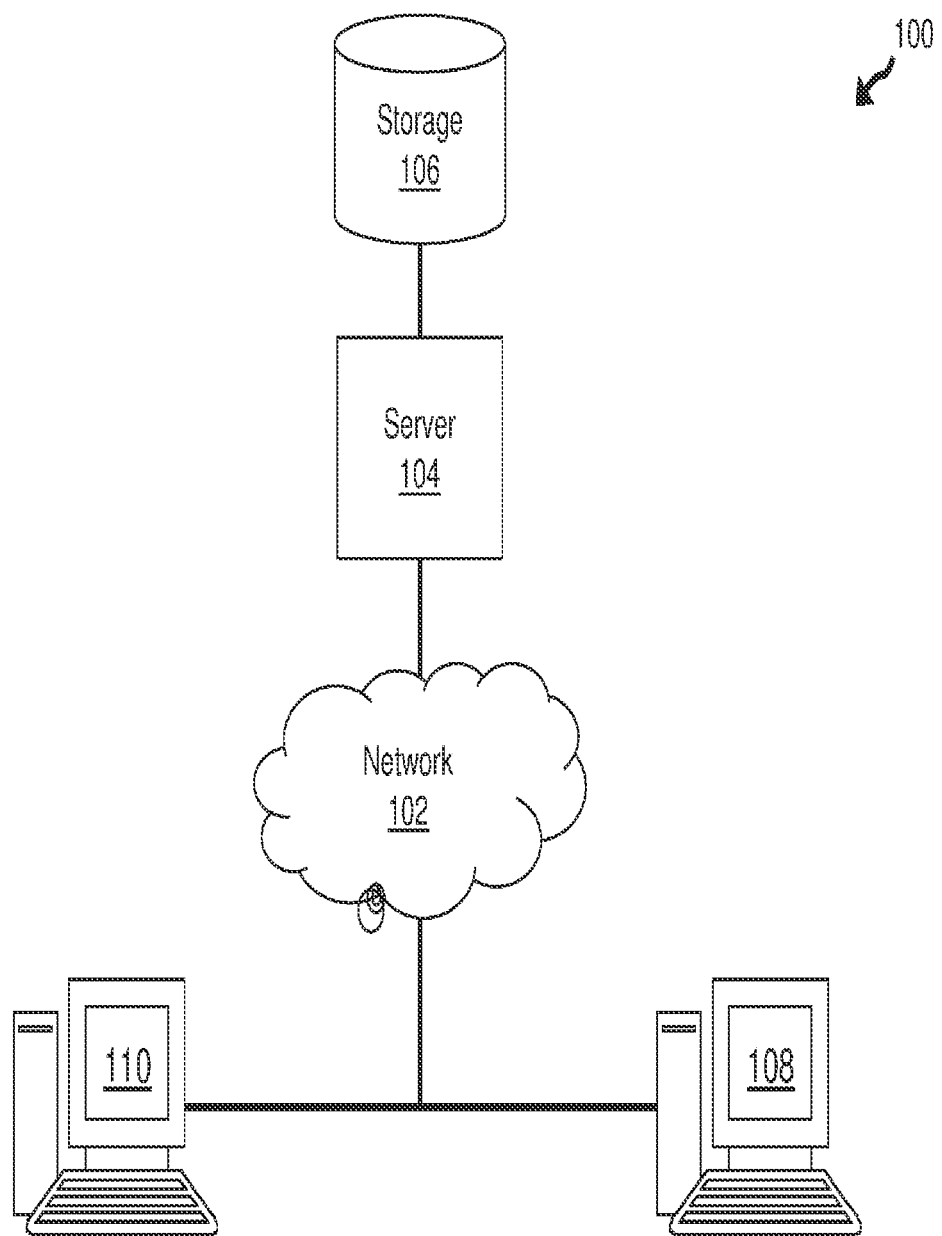
FIG. 1 illustrates a diagram of an embodiment of a network topology according to an embodiment.

Referring now to FIG. 1, a network topology 100 comprises a network 102, a server 104, a storage 106, an administrator workstation 108, and an operator workstation 110. The server 104 is in signal communication, whether wired, waveguide, or wireless, whether direct or indirect, with the network 102 and the storage 106. The storage 106 is in signal communication, whether wired, waveguide, or wireless, whether direct or indirect, with the server 104. The administrator workstation 108 is in signal communication, whether wired, waveguide, or wireless, whether direct or indirect, with the network 102, the server 104, the storage 106, and the operator workstation 110. The operator workstation 110 is in signal communication, whether wired, waveguide, or wireless, whether direct or indirect, with the network 102, the server 104, the storage 106, and the administrator workstation 108. As such, the server 104, the storage 106, the administrator workstation 108, and the operator workstation 110 can communicate with each other, whether wired, waveguide, or wireless, whether direct or indirect, whether over the network 102 or bypassing the network 102.

In particular, the network 102 includes a plurality of nodes that allow for sharing of resources or information. The network 102 can be wired, waveguide, or wireless. For example, the network 102 can be a local area network (LAN), a wide area network (WAN), a cellular network, a fiber optic network, or others.

The server 104 runs an operating system, such as MacOS®, Windows®, or others, and an application, such as a business logic application, on the operating system. The server 104 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The server 104 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic.

The storage 106 can comprise a storage medium, such as a data structure, a database, or others. For example, the database can include a relational database, an in-memory database, or others, which can store data, such as in a record field, and allow access to such data, whether in a raw state, a formatted state, an organized stated, or any other accessible state. For example, such data can include an image file, a sound file, an alphanumeric text string, or any other data. The storage 106 is configured for various data Input/output (I/O) operations, including reading, writing, editing, modifying, deleting, updating, searching, selecting, merging, sorting, encrypting/decrypting, de-duplicating, or others. In some embodiments, the storage 106 can be unitary with the server 104.

The administrator workstation 108 runs an operating system, such as MacOS®, Windows®, or others, and an application, such as an administrator application, on the operating system. The administrator workstation 108 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The administrator workstation 108 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic. As such, the application presents an administrator GUI configured to depict a page, where the page can include a visual element, such as a menu, enabling a control of an aspect of the topology 100, such as any hardware, software, or any other logic or functionality. For example, the administrator workstation 108 can be configured to control the network 102, the server 104, the storage 106, the operator workstation 112, or others.

The operator workstation 110 runs an operating system, such as MacOS®, Windows®, or others, and an application, such as an operator application, on the operating system. The operator workstation 110 can include and/or be coupled to, whether directly and/or indirectly, an input device, such as a mouse, a keyboard, a camera, whether forward-facing and/or back-facing, an accelerometer, a touchscreen, a biometric reader, a clicker, a microphone, or any other suitable input device. The operator workstation 110 can include and/or be coupled to, whether directly and/or indirectly, an output device, such as a display, a speaker, a headphone, a printer, or any other suitable output device. In some embodiments, the input device and the output device can be embodied in one unit, such as a touch-enabled display, which can be haptic. As such, the application presents an operator GUI configured to depict a page, where the page can include a visual element, such as a menu, enabling a value input and a polygonal shape depiction based on the value input. In some embodiments, the administrator workstation 108 and the operator workstation 110 are a single workstation.

In one mode of operation, the operator workstation 110 receives a first input, such as a string "two" or a value 4 or 3.2. For example, the first input can rate a category according to a model. For example, the model can include a data risk model, which rates data based on data sensitivity, such as from data type/format/content have low sensitivity (level 1 e.g. public data) to data type/format/content having high sensitivity (level 5 e.g. competitive intelligence). For example, the first input can define a threshold against which a SaaS server hosted application is compared against. The first input can be sourced from a user input device, such as a keyboard, whether physical or virtual, a mouse, a microphone, or others. The first input can be sourced from an application, whether running locally on the operator workstation 110, the server 104, or a remote data source.

The operator workstation 110 may display a user interface having a grid comprising a plurality of grid lines, where each of the grid lines have a polygonal shape and, as the scale of the grid increases, the size of the concentric polygonal shapes also increases. Each grid line is referred to herein as a "second polygonal shape." The second polygonal shape may have any number of sides, e.g., a pentagon, a hexagon, a heptagon, or others. The grid lines (second polygonal shapes) form vertices, where each vertex corresponds to a scale (e.g., zero to five) associated with a capability category (e.g., application security, data security, encryption, IAM, incident management, threat and vulnerability management, and vendor management).

The user interface also displays an area on the grid that represents an acceptable data risk score. This area extends from the center of the grid to the values corresponding to the grid line equal to a data risk score inputted in the user interface or used as a predetermined value. Because this area extends to a grid line value, this area also has the same shape as the grid lines, according to the exemplary embodiment. This area is referred to herein as a "first polygonal shape." The first polygonal shape may have any number of sides corresponding to the same number of sides of the second polygonal shape, e.g., a pentagon, a hexagon, a heptagon, or others. This user interface can assist a user to readily visualize the acceptable data risk score on the scale of the grid. For example, as shown in FIG. 3B, an area (first polygonal shape 314) extends to the value of 3 on the scale of the grid lines (second polygonal shapes) based on the inputted data risk score (in the first input section 304). The first polygonal shape can be visually distinct from the second polygonal shapes (grid lines), such as based on a line color around the area or a color or pattern that fills the area.

The user interface is configured to receive control score inputs (e.g., a set of inputs representing a particular cloud vendor) regarding the performance in each capability category to depict how it compares to the data risk area. In an embodiment, the operator workstation 110 receives a plurality of second inputs, whether identical to or different from each other in content or form, such as a string "four point three" or a value 1.6 or 3.9. For example, the second inputs can correspond to a plurality of category ratings in accordance with a model, as noted above with respect to the first input. For example, the second inputs can define a plurality of SaaS server hosted application scores, with each of the scores corresponding to a category rating, as mentioned above, where each of the application scores can be compared against a threshold, as noted above with respect to the first input and as further described below. For example, for a SaaS server hosted application, the categories can include application security, data security, encryption and key management, identity and accident management, incident response, threat and vulnerability management, vendor management, and others. Each of the categories can include a plurality of sub-categories, further defining that respective category and each of the sub-categories can be scored with a score, which is averaged with other sub-categories scores to define a score for that respective category. For example, the identity and access management category, the sub-categories can include authentication, privileged access management, provisioning, reporting, role based access controls, and others, each being individually scored and average to form a score for the identity and access management category. The second inputs can be sourced from a user input device, such as a keyboard, whether physical or virtual, a mouse, a microphone, or others. The second inputs can be sourced from an application, whether running locally on the operator workstation 110, the server 104, or a remote data source.

The control score inputs for each capability category are represented on the grid lines as another area, referred to herein as a "third polygonal shape." The third polygonal shape may have any number of sides, e.g., a pentagon, a hexagon, a heptagon, or others, over the first polygonal shape, but it does not need to be identical in shape to the first or second polygonal shapes. The third polygonal shape can be presented over the grid lines (second polygonal shapes) and the data risk area (first polygonal shape) to depict any coverage deficiencies between the third polygonal shape and the first polygonal shape (e.g., where the first polygonal shape is showing when the third polygonal shape is overlaid). The third polygonal shape can be visually distinct from the first polygonal shape and the second polygonal shapes, such as based on a line color around the area or a color or pattern that fills the area. For example, the third polygonal shape can be visually distinct from the first polygonal shape based on hatching. The third polygonal shape includes a plurality of third vertices. The third vertices are aligned with the scale of each capability category on the grid and can extend, whether uniformly or non-uniformly, along the scale based on the second inputs.

The grid can be configured or scaled based on the data inputs. For example, the second polygonal shapes can include an outermost polygonal shape and the first polygonal shape can avoid extending past the outermost polygonal shape. When the second inputs include a plurality of numerical values, such as 1.7 and 2, then the numerical values are shown external to the third polygonal shape and adjacent to the third vertices, such as being sufficiently close, such as inclusively within about two inches from the third vertices, as to visually associate the numerical values to the third vertices. A legend can also be presented concurrently with the first polygonal shape and the third polygonal shape, with the legend informative an interpretation of the first polygonal shape and the third polygonal shape, such as via illustrating, such as via color or hatching, what the first polygonal shape represents and the third polygonal shape represents. Further, a value corresponding to a distance between one of the first vertices and one of the third vertices can be determined, such as based on a slope, where the one of the first vertices and the one of the third vertices extend toward one of the second vertices. Then, the value can be presented as a negative value based on the one of the first vertices being closer to the one of the second vertices than the one of the third vertices or the value can be presented as a positive value based on the one of the third vertices being closer to the one of the second vertices than the one of the first vertices. Also, since the second polygonal shape includes an outermost polygonal shape, an area between the outermost polygonal shape and the third polygonal shape can be identified and be made visually distinct from the third polygonal shape, such as based on at least one of color or hatching.

Additionally, the user interface can present an area that represents a possible maximum performance (e.g., for a cloud vendor) to depict a distinction between the possible performance, current performance, and a data risk. This possible maximum performance is referred to herein as a "fourth polygonal shape," which may have any number of sides, e.g., a pentagon, a hexagon, a heptagon, or others. The fourth polygonal shape can be presented over the first polygonal shape and/or third polygonal shape. The fourth polygonal shape can be visually distinct from the other polygonal shapes, such as based on color or hatching. The fourth polygonal shape has vertices that are aligned with the scale of each capability category on the grid and can that extend, whether uniformly or non-uniformly, along the scale based on the fourth inputs.

Note that other modes of operations are possible, including any combinatory permutation of this disclosure. For example, a client-server delivery model, such as via a network page, is possible. Also, note that although some embodiments are described in context of evaluating a SaaS server hosted application, some embodiments can be used in context of evaluating any good or service, whether hardware or software, whether physical, electronic, digital, analog, transitory, or any other form/structure. For example, a good can include a vehicle, whether land, marine, or aerial, a medical device, or others. For example, a service can include a technique/strategy for accomplishing a certain goal, such as a medical procedure, an engineering procedure, a financial procedure, a military procedure, or others. Further, note that a polygon can be any polygon, whether having an open or closed shape, such having at least three sides.

Figure 2:
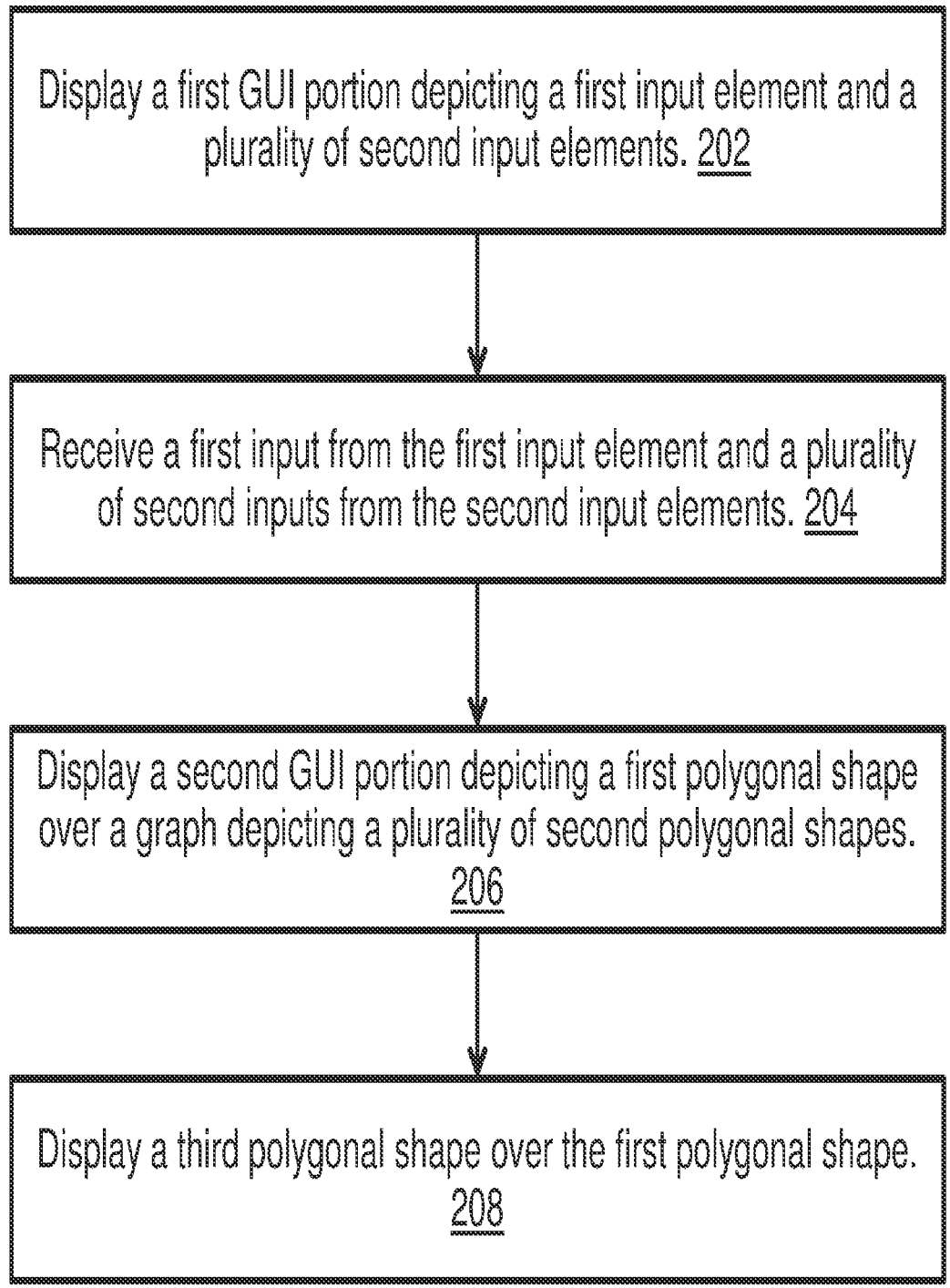
FIG. 2 illustrates a flowchart of an embodiment of a method of visualizing data according to an embodiment.

FIG. 2 shows a flowchart of an embodiment of a method of visualizing data according to this disclosure. A method 200 includes a plurality of blocks 202-208. The method 200 can be performed via the network topology 100 but is not limited to topology 100 and may be performed within different computer infrastructures.

In the block 202, a computing unit, such as a desktop, a laptop, a tablet, a smartphone, or others, displays a first GUI portion depicting a first input element, such as a text box, a cell, a dial, a button, a checkbox, or others, and a plurality of second input elements, such as a text box, a cell, a dial, a button, a checkbox, or others. The first input element and the second input element can be depicted concurrently, consecutively, or spaced part. The first GUI portion can be depicted via an operating system or an application, such as a spreadsheet or a browser.

In some configurations, the first GUI may be an interactive spreadsheet or any other graphical representation of one or more data security protocol questions that is configured to receive one or more inputs from the user regarding multiple software programs. In some configurations, the first GUI may be a reflexive questionnaire, which dynamically displays multiple questions and may change one or more questions based on the user's responses.

Figure 3A:
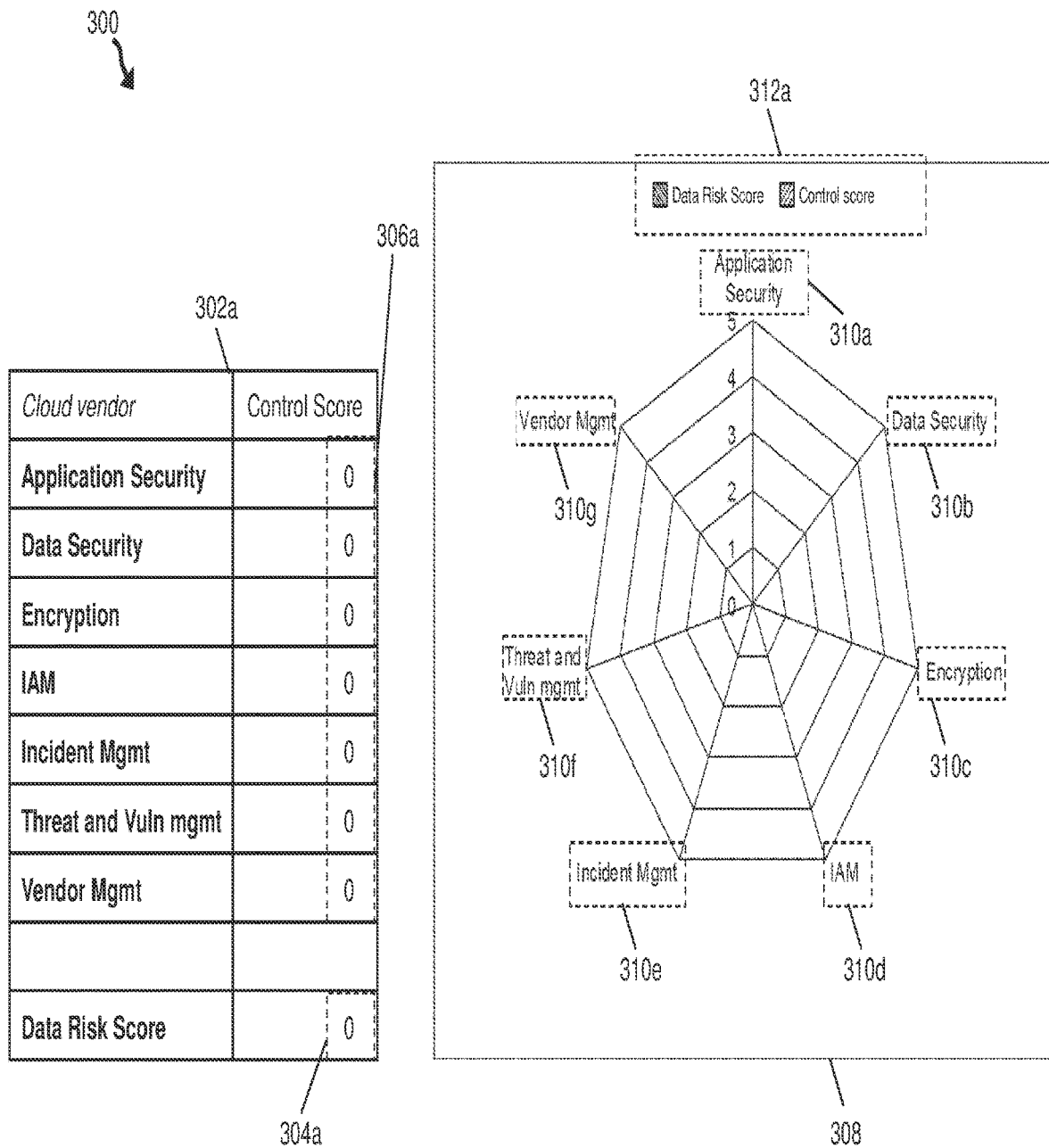
FIG. 3A illustrates a screenshot of an embodiment of a GUI page including in an input tabular portion with a plurality of default values and a graphical portion with a plurality of concentric polygonal shapes according to an embodiment.
Figure 3B:
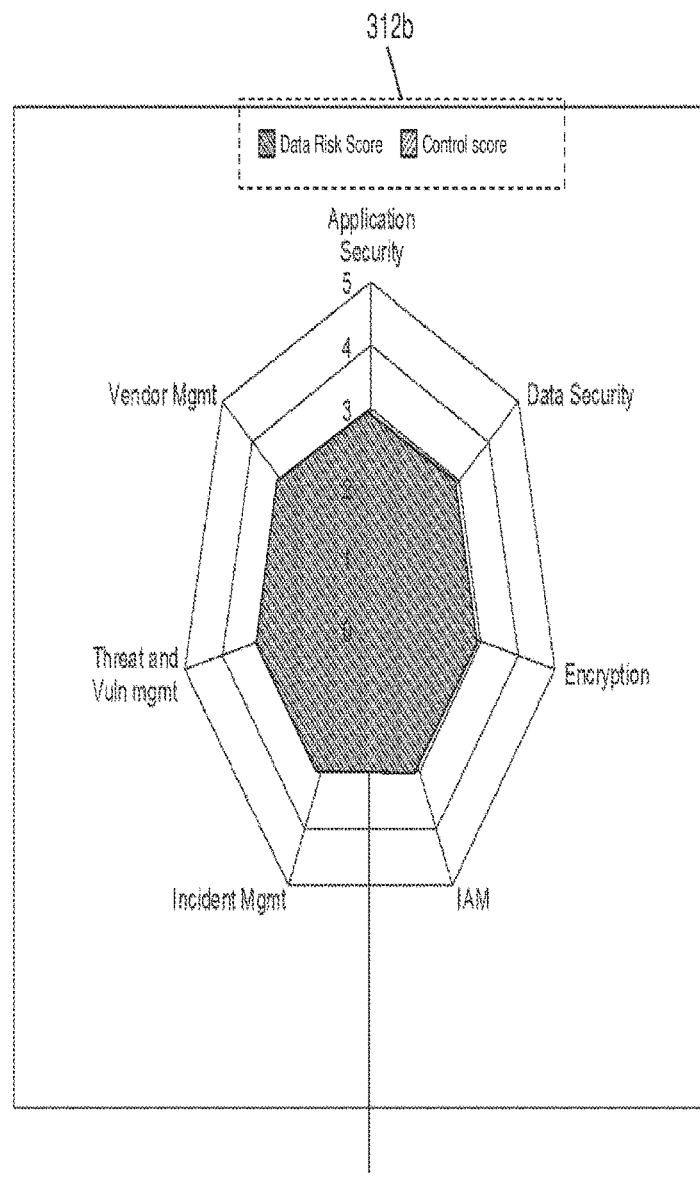
FIG. 3B illustrates a screenshot of an embodiment of an input tabular portion with a first input value and a graphical portion with a first polygonal shape formed based on the first input value and depicted over the concentric polygonal shapes according to an embodiment.
Figure 3C:
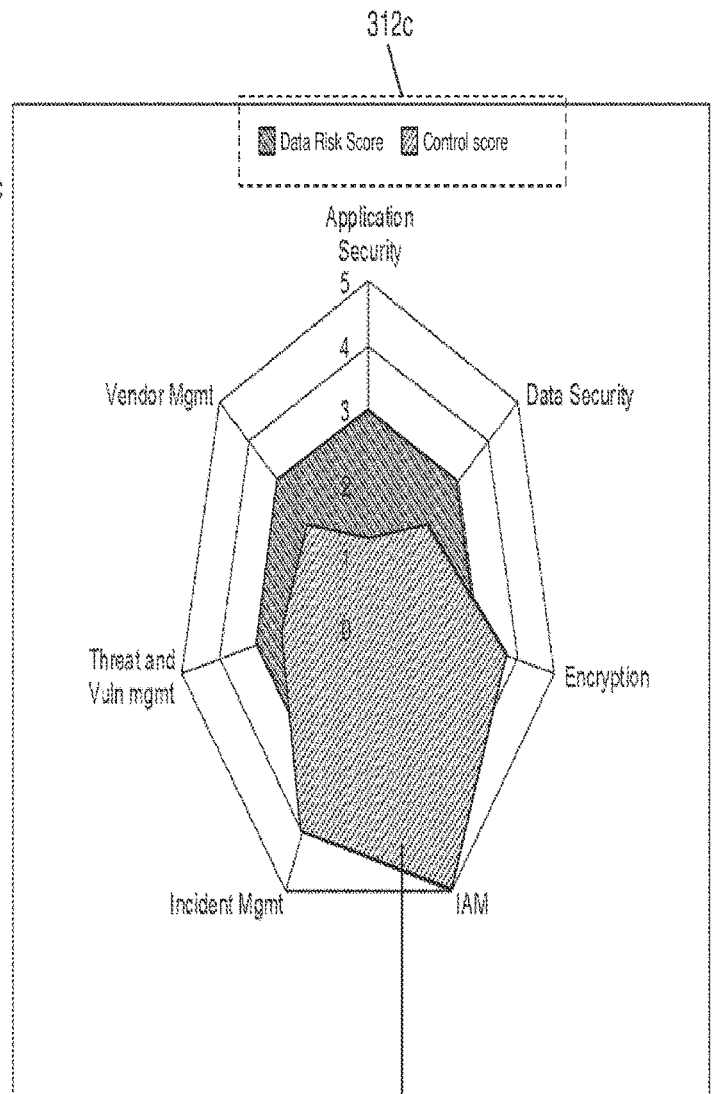
FIG. 3C illustrates a screenshot of an embodiment of an input tabular portion with a plurality of second input values and a graphical portion with a second polygonal shape formed based on the second input values and depicted over the concentric polygonal shapes and the first polygonal shape according to an embodiment.

Referring now to FIG. 3C, an example of a first GUI is illustrated. The GUI 500 may be displayed on the user computing device and may be configured to receive one or more inputs regarding application security of one or more software programs. For example, GUI 500 may display column 502 (describing the category of scores to be inputted) and column 504 (specific sub-category of the score). GUI 500 may also display scoring descriptions to guide the user determine an accurate score. For example, GUI 500 may display columns 508-518 describing a scoring paradigm for each category and/or sub-category. GUI 500 may also include an input element 506 configured to receive an input (e.g., numerical scores) from the user for each category. In some configurations, different components of the GUI 500 may be reflexively displayed. For clarity, GUI 500 only illustrates application security scoring paradigms. In some configurations, GUI 500 may also include other categories (e.g., data security, encryption and key management, vendor management, incident management, and threat and vulnerability management).

Referring back to FIG. 2, in the block 204, the computing unit receives a first input, such as a numerical value, from the first input element and a plurality of second inputs, such as a plurality of numerical values, from the second input elements. For example, the first input can rate a category according to a model. For example, the model can include a data risk model, which rates data based on data sensitivity, such as from data type/format/content have low sensitivity (level 1 e.g. public data) to data type/format/content having high sensitivity (level 5 e.g. competitive intelligence). For example, the first input can define a threshold against which a SaaS server hosted application is compared against. For example, the second inputs can correspond to a plurality of category ratings in accordance with a model, as noted above with respect to the first input. For example, the second inputs can define a plurality of SaaS server hosted application scores, with each of the scores corresponding to a category rating, as mentioned above, where each of the application scores can be compared against a threshold, as noted above with respect to the first input and as further described below. For example, for a SaaS server hosted application, the categories can include application security, data security, encryption and key management, identity and accident management, incident response, threat and vulnerability management, vendor management, and others.

Each of the categories can include a plurality of sub-categories, further defining that respective category and each of the sub-categories can be scored with a score, which is averaged with other sub-categories scores to define a score for that respective category. For example, the identity and access management category, the sub-categories can include authentication, privileged access management, provisioning, reporting, role based access controls, and others, each being individually scored and average to form a score for the identity and access management category.

In the block 206, the computing unit displays a second GUI portion depicting a first polygonal shape, such as including at least five sides, such as a pentagon, a hexagon, a heptagon, or others, over a graph depicting a plurality of second polygonal shapes, such as including at least five sides, such as a pentagon, a hexagon, a heptagon, or others. The first GUI portion and the second GUI portion can be displayed concurrently, consecutively, or spaced apart. The second GUI portion can be depicted via an operating system or an application, such as a spreadsheet or a browser. The first polygonal shape is concentric to the second polygonal shapes. The second polygonal shapes are concentric to each other such that the second polygonal shapes define a concentrically graduated scale. As such, the first polygonal shape uniformly expands outwardly or uniformly shrinks inwardly over a number of the second polygonal shapes corresponding to the first input, with the number being visually approximated via the concentrically graduated scale. In some configurations, the GUI display portion may be dynamically adjusted, in real time, based on the user's inputs.

In the block 208, the computing unit displays a third polygonal shape, such as including at least five sides, such as a pentagon, a hexagon, a heptagon, or others, over the first polygonal shape. The third polygonal shape includes a plurality of third vertices. The third polygonal shape is visually distinct from the first polygonal shape and the second polygonal shapes, such as based on color, such as based on a plurality of parametrical outlines, or the third polygonal shape being color filled, such as green. In some embodiments, the third polygonal shape is visually distinct from the first polygonal shape based on hatching. The third vertices extend, whether uniformly or non-uniformly, toward or away from the second vertices outward based on the second inputs. In some embodiments, the server 104 presents the third polygonal shape over the first polygonal shape. The second polygonal shapes include an outermost polygonal shape and the first polygonal shape can avoid extending past the outermost polygonal shape. When the second inputs include a plurality of numerical values, such as 2.2 and 1.7, then the numerical values are shown external to the third polygonal shape and adjacent to the third vertices, such as being sufficiently close, such as inclusively within about two inches from the third vertices, as to visually associate the numerical values to the third vertices.

In some configurations, a legend can also be presented concurrently with the first polygonal shape and the third polygonal shape, with the legend informative an interpretation of the first polygonal shape and the third polygonal shape, such as via illustrating, such as via color or hatching, what the first polygonal shape represents and the third polygonal shape represents. Further, a value corresponding to a distance between one of the first vertices and one of the third vertices can be determined, such as based on a slope, where the one of the first vertices and the one of the third vertices extend toward one of the second vertices. Then, the value can be presented as a negative value based on the one of the first vertices being closer to the one of the second vertices than the one of the third vertices or the value can be presented as a positive value based on the one of the third vertices being closer to the one of the second vertices than the one of the first vertices. Also, since the second polygonal shape includes an outermost polygonal shape, an area between the outermost polygonal shape and the third polygonal shape can be made visually distinct from the third polygonal shape, such as based on at least one of color or hatching.

FIG. 3A shows a screenshot of an embodiment of a GUI page including in an input tabular portion with a plurality of default values and a graphical portion with a plurality of concentric polygonal shapes according to this disclosure. As understood in context of FIGS. 1-2, a GUI page 300 includes an input tabular portion 302a and a graphical portion 308, with the input tabular portion 302a and the graphical portion 308 being positioned laterally side-by-side to each other, although other positioning is possible, such above-below or diagonal in any manner. Although the input tabular portion 302a is tabular, other formats are possible, such linear or others. Also, although the GUI page 300 is depicted in a spreadsheet format, the GUI page 300 can be depicted via an operating system or an application, such as a word processor or a browser. Further, although the input tabular portion 302a and the graphical portion 308 are displayed concurrently, the input tabular portion 302a and the graphical portion 308 can be displayed consecutively or spaced apart.

The input tabular portion 302a includes a first input section 304a and a second input section 306a. The first input section 304a correspond to the first input, as described above in context of FIGS. 1-2. The second input section 306a corresponds to the second inputs, as described above in context of FIGS. 1-2. Note that the first input portion 302a is programmed to recite a plurality of default values, such as 0, although the default values can be any value of any data type, such as alphanumeric, pictorial, symbolic, or others.

The graphical portion 308 depicts a plurality of concentric polygonal shapes, which define a concentrically graduated scale, as described above in context of FIGS. 1-2. Also, the graphical portion 308 depicts a legend 312a, which is color based, although a hatching legend is possible. The legend 312a may be sourced from a cell value in a left column of the second input portion 306a, although other variations on this configuration are possible. Note that the legend 312a can be positioned anywhere in the graphical portion 308 or anywhere in the input tabular portion 302a.

In the graphical portion 308, the concentric polygonal shapes include a plurality of rectilinearly aligned vertices and an outermost polygonal shape of the concentric polygonal shapes has its vertices labeled with a plurality of labels 310. Each of the labels 310 recites an alphanumeric string corresponding to or sourced from a cell value in a left column of the second input portion 306a, although other variations on this configuration are possible. Additionally, note that the concentric polygonal shapes, which define the concentrically graduated scale, are numerically labeled from an innermost polygonal shape to the outermost polygonal shape, with the numeric labeling being recited in a numerically increasing form from the innermost polygonal shape to the outermost polygonal shape. However, note that variations on this configuration are possible, such as labeling being alphanumerical, pictorial, or symbolic. Likewise, the numeric labeling being recited in a numerically decreasing form from the innermost polygonal shape to the outermost polygonal shape or vice versa.

FIG. 3B shows a screenshot of an embodiment of an input tabular portion with a first input value and a graphical portion with a first polygonal shape formed based on the first input value and depicted over the concentric polygonal shapes according to this disclosure. As understood in context of FIGS. 1-3, the first input section 304b receives the first input, such as 3, with the second input portion 306b being unchanged in value. Therefore, the graphical portion 308 depicts a first polygonal shape 314 based on the first input. The first polygonal shape 314 is visually distinct from the concentric polygonal shapes by color, although hatching is possible. Note that the legend 312b is informative of such visual distinctness.

The first polygonal shape is concentric to the concentric polygonal shapes. As such, the first polygonal shape uniformly expands outwardly or uniformly shrinks inwardly over a number of the concentric polygonal shapes corresponding to the first input, with the number being visually approximated via the concentrically graduated scale.

FIG. 3C shows a screenshot of an embodiment of an input tabular portion with a plurality of second input values and a graphical portion with a second polygonal shape formed based on the second input values and depicted over the concentric polygonal shapes and the first polygonal shape according to this disclosure. As understood in context of FIGS. 1-4, the first input section 304c remains unchanged in value, but the second input portion 306c receives the second inputs. Therefore, the graphical portion 308 depicts a second polygonal shape 316 based on the second inputs, with the second polygonal shape 316 being originated from a center of the first polygonal shape 314 and the concentric polygonal shapes. The second polygonal shape 316 is visually distinct from the concentric polygonal shapes and the first polygonal shape 314 by color, although hatching is possible. Note that the legend 312c is informative of such visual distinctness. As such, the second polygonal shape 316 non-uniformly or uniformly (depending on the second inputs) expands outwardly or non-uniformly or uniformly shrinks inwardly over a number of the concentric polygonal shapes corresponding to the second inputs, with the number being visually approximated via the concentrically graduated scale.

Figure 3D:
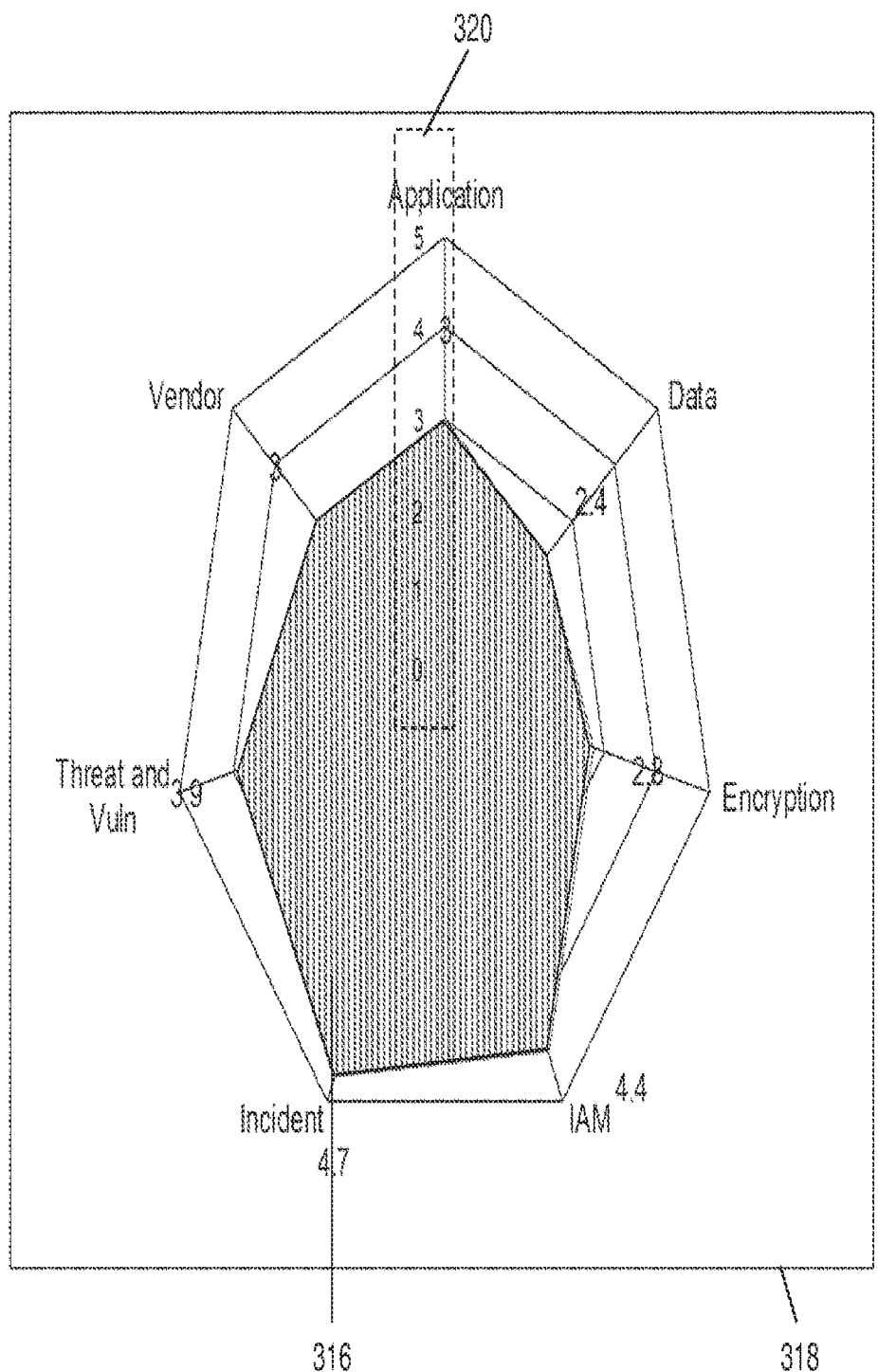
FIG. 3D illustrates a screenshot of an embodiment of a graphical portion depicting a plurality of vertices of an outermost concentric polygonal shape being labeled with a plurality of alphabetical labels, the concentric polygonal shapes being labeled with a plurality of numerically consecutive values, and a plurality of vertices of the second polygonal shape being labeled with a plurality of numerical labels based on the second input values according to an embodiment.

FIG. 3D shows a screenshot of an embodiment of a graphical portion depicting a plurality of vertices of an outermost concentric polygonal shape being labeled with a plurality of alphabetical labels, the concentric polygonal shapes being labeled with a plurality of numerically consecutive values, and a plurality of vertices of the second polygonal shape being labeled with a plurality of numerical labels based on the second input values according to this disclosure. As understood in context of FIGS. 1-5, the second polygonal shape 316 is depicted without the first polygonal shape 314, with the first input section 304 correspondingly having been set to a default value, such as 0. Note that the second inputs are presented as a plurality of values in the graphical component 318 in proximity of the second polygonal shape 316, external to the second polygonal shape 316 and correspondingly adjacent to the vertices of the second polygonal shape 316. Also, note that the concentric polygonal shapes, which define the concentrically graduated scale, are labeled with a plurality of numerically consecutive values 320 from the innermost polygonal shape to the outermost polygonal shape, with the numeric labeling being recited in the numerically increasing form from the innermost polygonal shape to the outermost polygonal shape. However, note that variations on this configuration are possible, such as labeling being alphanumerical, pictorial, or symbolic. Likewise, the numeric labeling being recited in a numerically decreasing form from the innermost polygonal shape to the outermost polygonal shape or vice versa.

Figure 3E:
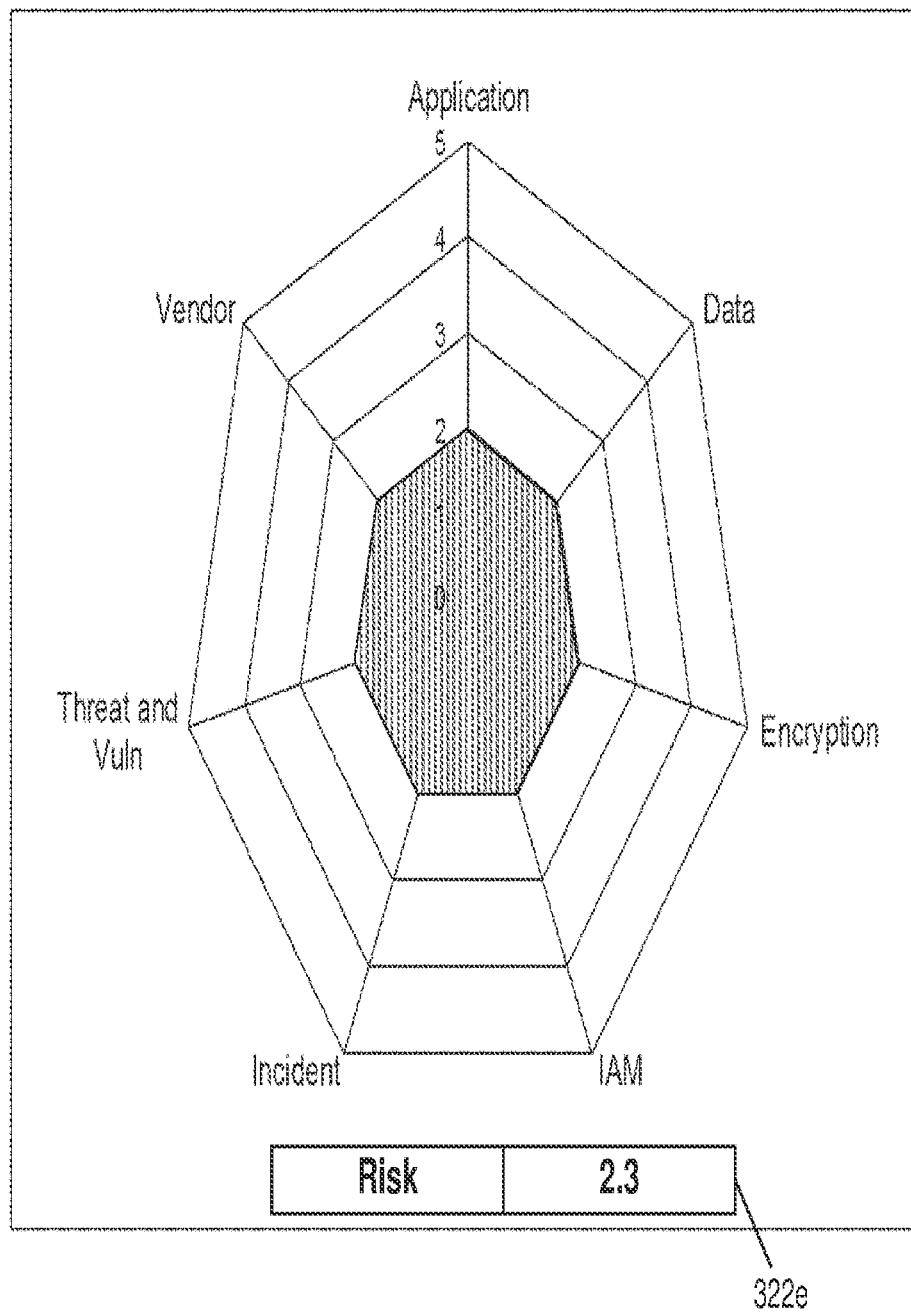
FIG. 3E illustrates a screenshot of an embodiment of a graphical portion containing a tabular portion depicting a name cell corresponding to the first input value and a value cell storing the first input value, with the tabular portion and the first polygonal shape being identically colored according to an embodiment.
Figure 3F:
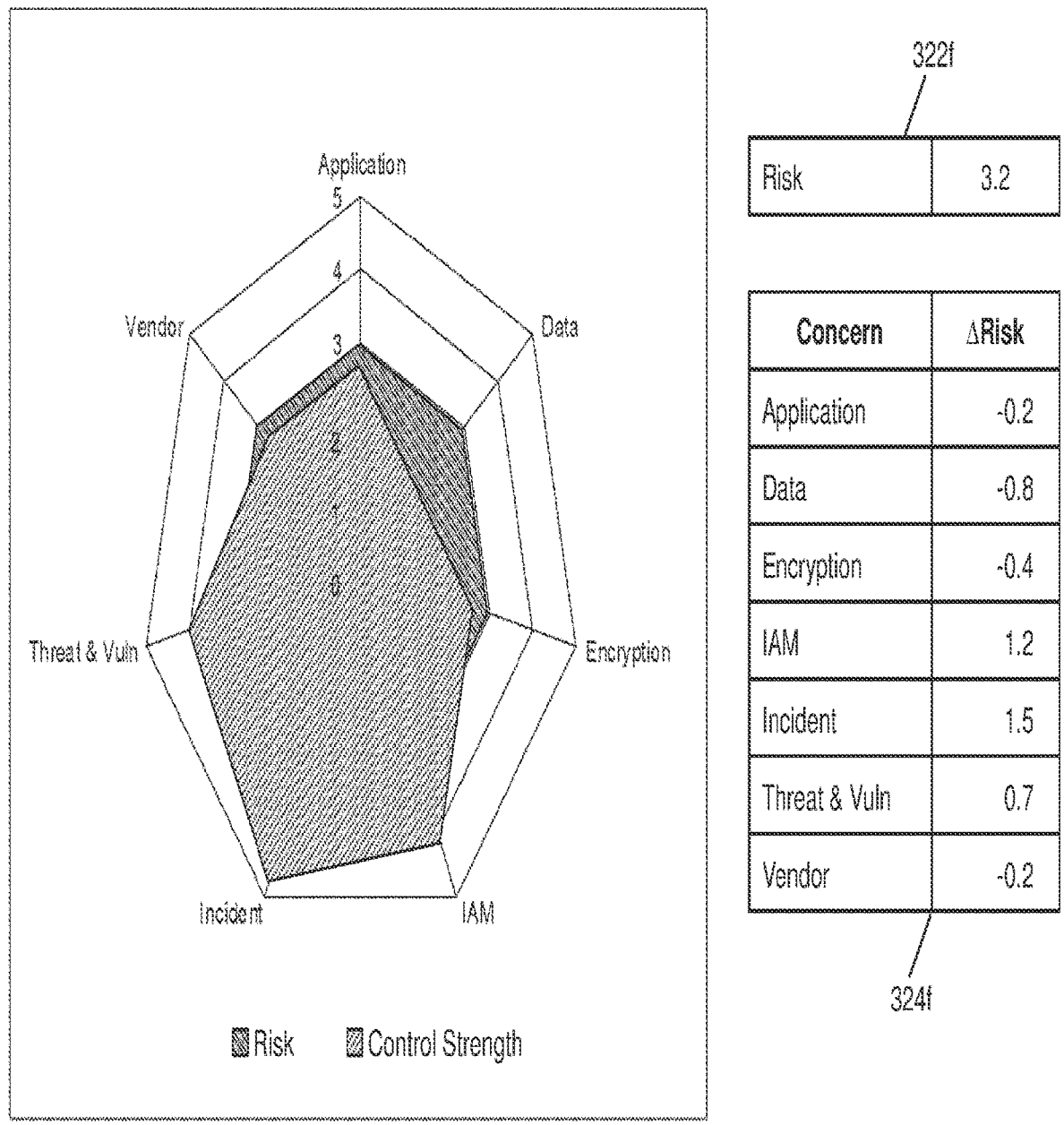
FIGS. 3F-3I illustrate a plurality of screenshots of a plurality of embodiments of a plurality of graphical portions, with each of the graphical portions containing a tabular portion with a names column corresponding to the second input values and a value column storing the second input values according to an embodiment.
Figure 3G:
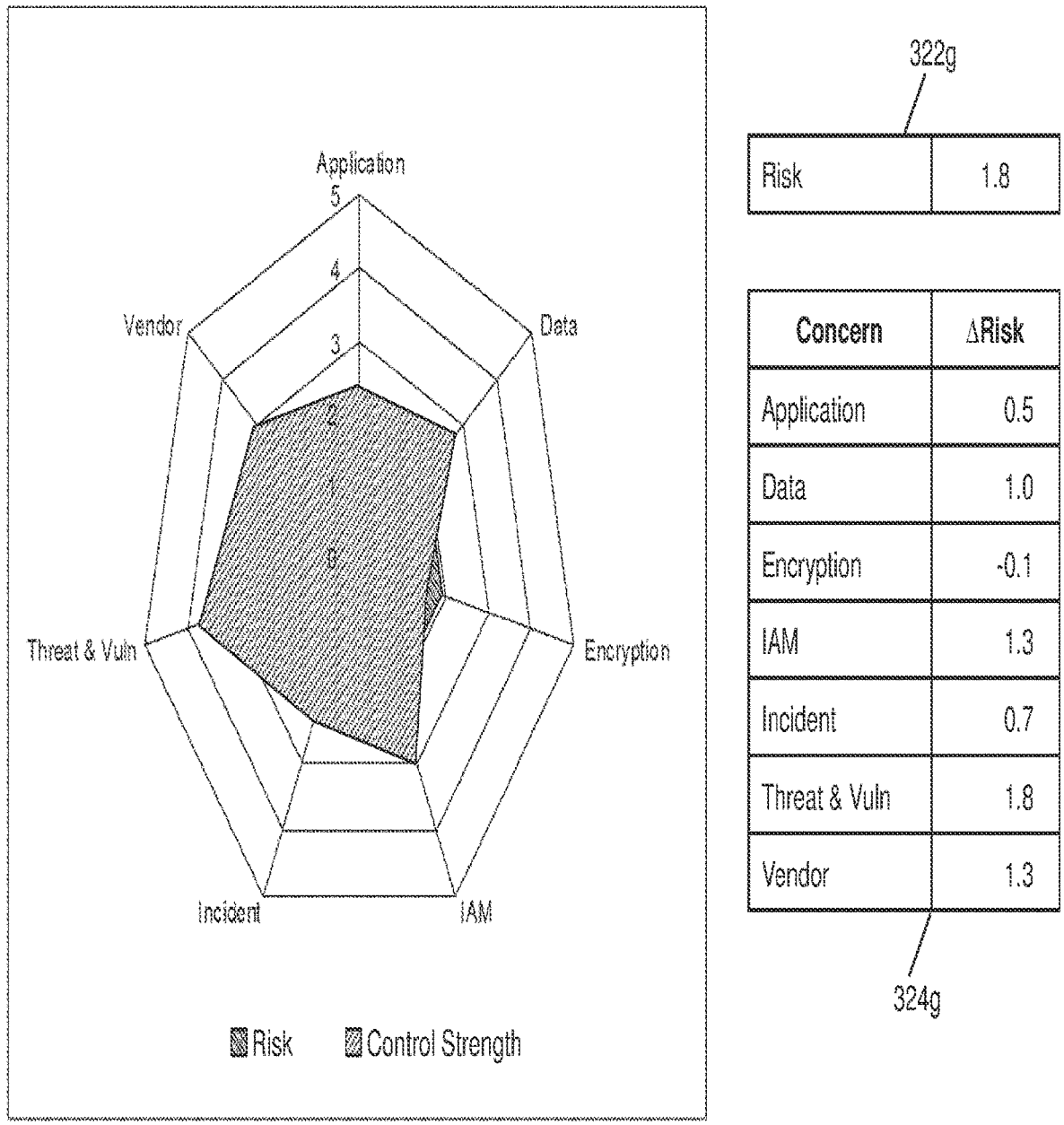
Figure 3H:
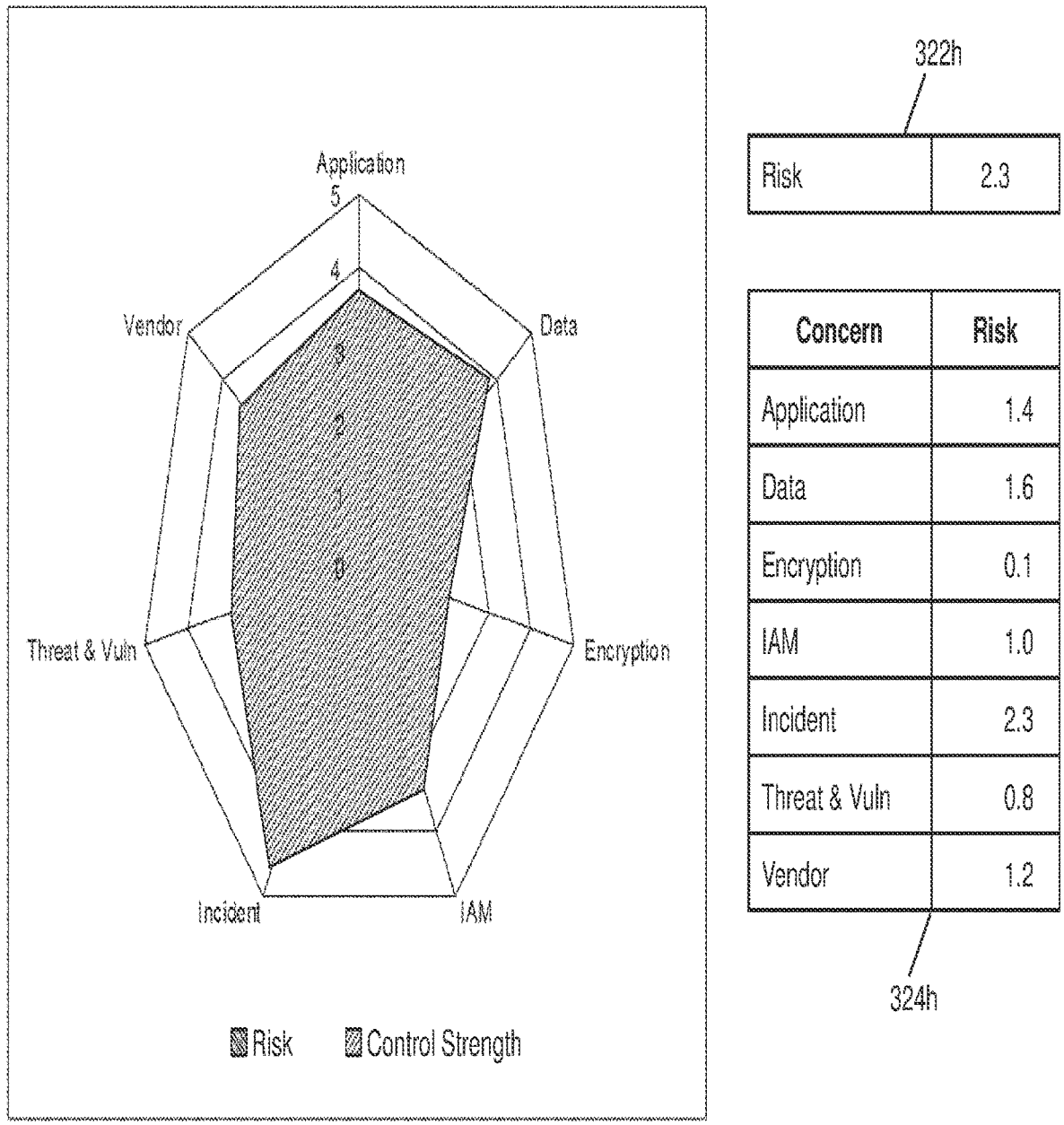
Figure 3I:
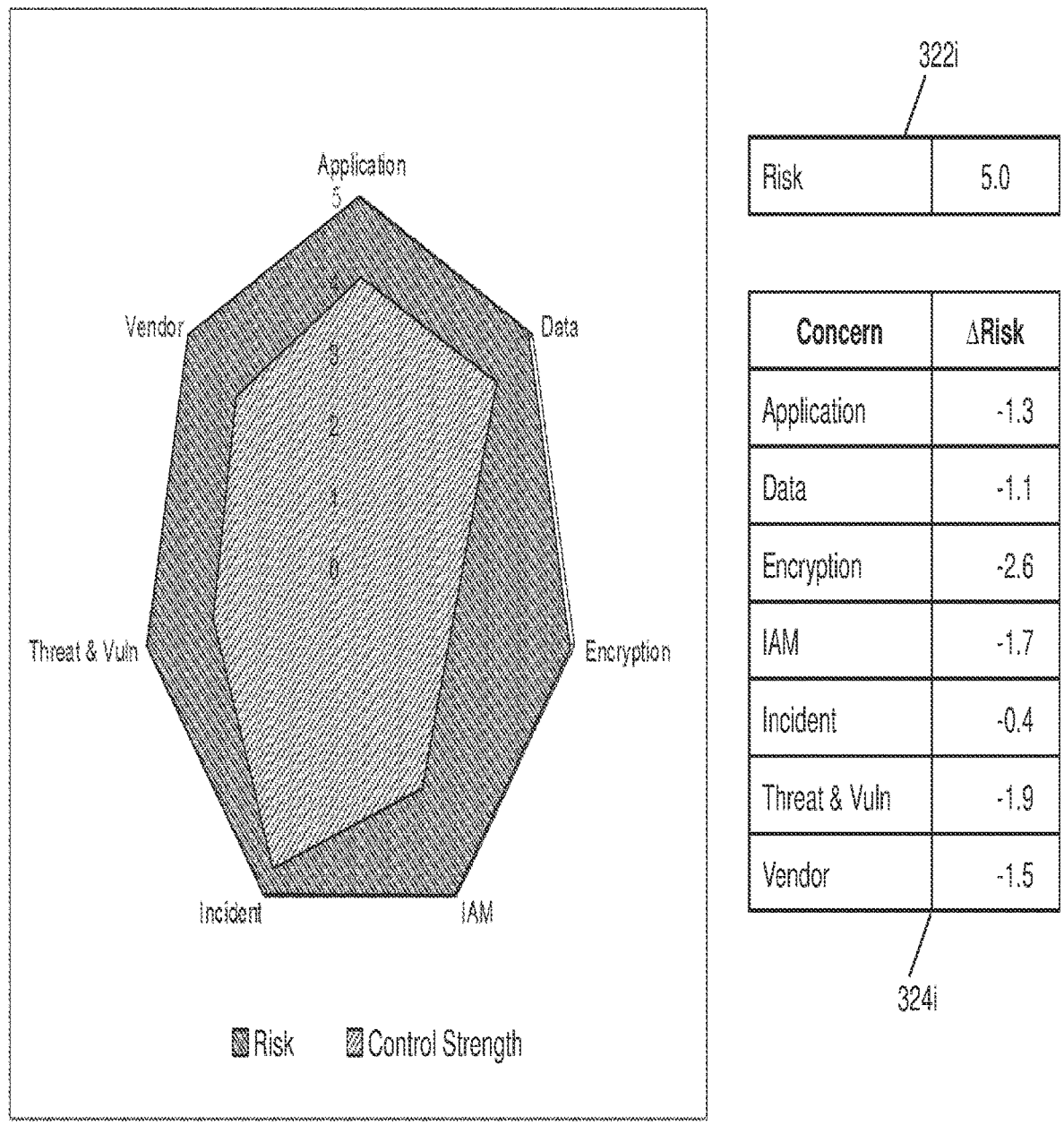

FIG. 3E shows a screenshot of an embodiment of a graphical portion containing a tabular portion depicting a name cell corresponding to the first input value and a value cell storing the first input value, with the tabular portion and the first polygonal shape being identically colored according to this disclosure. As understood in context of FIGS. 1-6, the first input corresponding to or sourced from the first input section 304 is shown in a bi-cellular form 322 storing a first input alphanumeric identifier and a first input value. The bi-cellular form 322e is visually distinct according to the first polygonal shape 314, such as by color or hatching. Note that the first polygonal shape 314 uniformly extends over the concentric polygonal shapes according to the first input, such as 2.3.

FIGS. 3F-3I show a plurality of screenshots of a plurality of embodiments of a plurality of graphical portions, with each of the graphical portions containing a tabular portion with a names column corresponding to the second input values and a value column storing the second input values according to this disclosure. As understood in context of FIGS. 1-7, a table 324f-i is shown adjacent to the graph depicting the first polygonal shape 314, the second polygonal shape 316, the concentric polygonal shapes, and the bi-cellular form 322f-i. The table 324f-i includes a plurality of columns and a plurality of rows. The columns include a names column and a value column. The names column includes a plurality of label cells corresponding to or sourced from the labels 310a-g (collectively labels 310). The value column includes a plurality of value cells corresponding to a calculated difference between the first input for that category and the second input for that category, with the calculated difference being presented as a positive (above the threshold, with the threshold being the first polygonal shape 314) or a negative value (below the threshold, with the threshold being the first polygonal shape 314), which are visually distinct based on the first polygonal shape 314 and the second polygonal shape 316. For example, a row containing an application category name and a value −0.2 is informative of a calculated difference between the value of the first input for the application category and the value of the second input for the application category, with the value 0.2 being depicted red and negative because the first polygonal shape 314, which is depicted red, is closer to the outermost concentric polygonal shape than the second polygonal shape 316 in that category. In contrast, a row containing an incident category name and a value 1.5 is informative of a calculated difference between the value of the first input for the application category and the value of the second input for the application category, with the value 1.5 being depicted green and negative because the second polygonal shape 316, which is depicted green, is closer to the outermost concentric polygonal shape than the first polygonal shape 314 in that category.

Figure 3J:
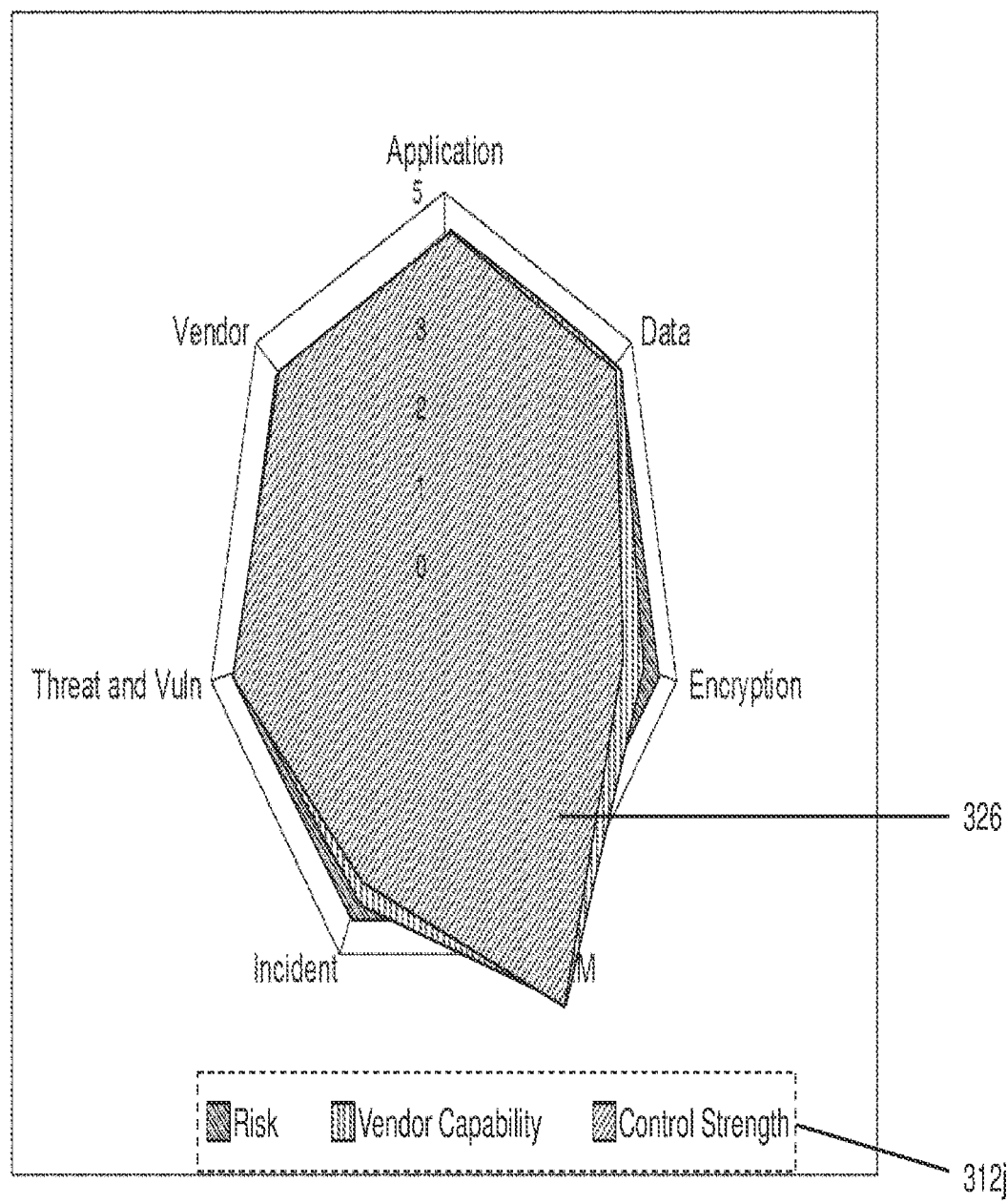
FIG. 3J illustrates a screenshot of an embodiment of a graphical portion depicting a third polygonal shape being formed based on a plurality of third input values and depicted over the concentric polygonal shapes according to an embodiment.

FIG. 3J shows a screenshot of an embodiment of a graphical portion depicting a third polygonal shape being formed based on a plurality of third input values and depicted over the concentric polygonal shapes according to this disclosure. As understood in context of FIGS. 1-11, a third polygonal shape 326 is shown, as informed via the legend 312j. The third polygonal shape 326 is visually distinct from the first polygonal shape 314, the second polygonal shape 316, and the concentric polygonal shapes, such as via color, such as by filling or perimetrical outlines, or hatching. The third polygonal shape is based on a plurality of third inputs, whether identical to or different from each other in content or form, such as a string "two dot one" or a value 0.2 or 6.3. For example, the third inputs can correspond to a plurality of category ratings in accordance with a model, as noted above with respect to the first input. For example, the second inputs can define a plurality of SaaS server hosted application capability scores, with each of the scores corresponding to a capability category rating, as mentioned above, where each of the application capability scores can be compared against a threshold, as noted above with respect to the first input and as further described below. For example, for a SaaS server hosted application, the categories can include application security, data security, encryption and key management, identity and accident management, incident response, threat and vulnerability management, vendor management, and others. Each of the categories can include a plurality of sub-categories, further defining that respective category and each of the sub-categories can be scored with a score, which is averaged with other sub-categories scores to define a score for that respective category. For example, the identity and access management category, the sub-categories can include authentication, privileged access management, provisioning, reporting, role based access controls, and others, each being individually scored and average to form a score for the identity and access management category. The third inputs can be sourced from a user input device, such as a keyboard, whether physical or virtual, a mouse, a microphone, or others. The third inputs can be sourced from an application, whether running locally on the operator workstation 110, the server 104, or a remote data source.

FIG. 4 shows a screenshot of an embodiment of a GUI page depicting a plurality of tabular portions, each of the tabular portions containing a plurality of cells, each of the cells is color coded based on a graphical portion depicting a third polygonal shape being formed based on a plurality of third input values and depicted over the concentric polygonal shapes according to this disclosure. A GUI page 400 depicts a plurality of tabular portions 402a-d (collectively tabular portions 402) corresponding to a plurality of categories corresponding to a plurality of vertices of a plurality of concentric polygonal shapes. Each of the tabular portions 402 contains a plurality of cells, with each of the cells being color coded based on the graphical portion 308 of FIG. 3J, where the third polygonal shape 326 is formed based on the third input values and depicted over the concentric polygonal shapes. For example, with respect to a vendor management tabular portion 402, which is shown as a vertex of the second polygonal shape 316 extending toward a vertex of the outermost concentric polygonal shape labeled with a vendor label 310 in FIG. 3J, except for a direct damage liability row, other rows are above the threshold as defined via the first input, which is shown as a vertex of the first polygonal shape 314 extending toward the vertex of the outermost concentric polygonal shape labeled with a vendor label 310 in FIG. 3J. In contrast, in an incident management tabular portion 402, which is shown as a vertex of the second polygonal shape 316 extending toward a vertex of the outermost concentric polygonal shape labeled with an incident label 310 in FIG. 3J, a forensic row and a logging row are below the threshold as defined via the first input, which is shown as a vertex of the first polygonal shape 314 extending toward the vertex of the outermost concentric polygonal shape labeled with an incident label 310 in FIG. 3J. Likewise, a monitoring and alerting row, which is shown in context of third polygonal shape 326, is shown as not being met, although available, but still below the threshold.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to a +/−10% variation from the nominal value/term. Such variation is always included in any given.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method of displaying a graphical user interface illustrating network-based application compliance data, the method comprising:

displaying, on a display of a computer assembly, the graphical user interface comprising a polygonal graph having a plurality of first vertices corresponding to a plurality of network-based application compliance risk categories;

receiving, by a processor of the computer assembly, a first input corresponding to a compliance threshold score for the plurality of network-based application compliance risk categories;

displaying, on the display, the graphical user interface comprising a first polygonal shape overlapping with the polygonal graph such that the first polygonal shape is concentric to the polygonal graph, wherein the first polygonal shape includes a plurality of second vertices corresponding to the compliance threshold score;

receiving, by the processor, a plurality of second inputs representative of a plurality of evaluations of the network-based application compliance data; and displaying, on the display, the graphical user interface comprising a second polygonal shape over the polygonal graph, wherein the second polygonal shape includes a plurality of third vertices representative of the plurality of evaluations of the network-based application compliance data.

2. The method of claim 1, wherein the plurality of first vertices comprises a first vertex, the plurality of second vertices comprises a second vertex, and the plurality of third vertices comprises a third vertex, wherein the first vertex, the second vertex, and the third vertex are aligned on an axis, wherein a first distance between the first vertex and the second vertex is based on the first input, and wherein a second distance between the first vertex and the third vertex is based on a second input of the plurality of second inputs.

3. The method of claim 1, wherein at least one second input of the plurality of second inputs is sourced from an application programming interface.

4. The method of claim 1, wherein at least one second input of the plurality of second inputs is sourced from a user input device comprising a mouse, a keyboard, a camera, an accelerometer, a touchscreen, a biometric reader, a clicker, a microphone, or any combination thereof.

5. The method of claim 1, comprising displaying, on the display, the graphical user interface comprising numerical values that are positioned external to the second polygonal shape.

6. The method of claim 5, wherein the numerical values correspond to a plurality of risk levels associated with the plurality of evaluations of the network-based application compliance data.

7. The method of claim 1, wherein the plurality of network-based application compliance risk categories comprise an application security risk category, a data security risk category, an encryption risk category, an incident management risk category, a threat and vulnerability management risk category, a vendor management risk category, or any combination thereof.

8. The method of claim 1, wherein the polygonal graph comprises at least one line of symmetry.

9. The method of claim 1, wherein the polygonal graph comprises at least five sides.

10. A non-transitory, computer readable medium, comprising instructions stored thereon that, when executed by a processor, cause the processor to: generate, for a display of a client computing device, a graphical user interface comprising a polygonal graph having a plurality of first vertices representative of a plurality of network-based application compliance risk categories; generate, for the display of the client computing device, the graphical user interface comprising a first polygonal shape overlapping with the polygonal graph such that the first polygonal shape is concentric to the polygonal graph, wherein the first polygonal shape includes a plurality of second vertices representative of one or more compliance threshold scores for the plurality of network-based application compliance risk categories; and generate, for the display of the client computing device, the graphical user interface comprising a second polygonal shape over the polygonal graph, wherein the second polygonal shape includes a plurality of third vertices representative of the plurality of evaluations of the network-based application compliance data.

11. The non-transitory, computer readable medium of claim 10, wherein the plurality of first vertices comprises a first vertex, the plurality of second vertices comprises a second vertex, and the plurality of third vertices comprises a third vertex, wherein the first vertex, the second vertex, and the third vertex are aligned on an axis, wherein a first distance between the first vertex and the second vertex is based on the one or more compliance threshold scores, and wherein a second distance between the first vertex and the third vertex is based on an evaluation of the plurality of evaluations of the network-based application compliance data.

12. The non-transitory, computer readable medium of claim 10, wherein the instructions, when executed by the processor, cause the processor to receive at least one evaluation of the plurality of evaluations of the network-based application compliance data as an input from an application programming interface.

13. The non-transitory, computer readable medium of claim 10, wherein the instructions, when executed by the processor, cause the processor to receive at least one evaluation of the plurality of evaluations of the network-based application compliance data as an input from a user input device comprising a mouse, a keyboard, a camera, an accelerometer, a touchscreen, a biometric reader, a clicker, a microphone, or any combination thereof.

14. The non-transitory, computer readable medium of claim 10, wherein the plurality of network-based application compliance risk categories comprise an application security risk category, a data security risk category, an encryption risk category, an incident management risk category, a threat and vulnerability management risk category, a vendor management risk category, or any combination thereof.

15. A computer system configured to generate a graphical user interface illustrating network-based application compliance data, the computer system being configured to: generate the graphical user interface comprising a polygonal graph having a plurality of first vertices representative of a plurality of network-based application compliance risk categories; receive a first input corresponding to a compliance threshold score for the plurality of network-based application compliance risk categories; generate the graphical user interface comprising a first polygonal shape overlapping with the polygonal graph such that the first polygonal shape is concentric to the polygonal graph, wherein the first polygonal shape includes a plurality of second vertices representative of the compliance threshold score; receive a plurality of second inputs representative of a plurality of evaluations of the network-based application compliance data; and generate the graphical user interface comprising a second polygonal shape over the polygonal graph, wherein the second polygonal shape includes a plurality of third vertices representative of the plurality of evaluations of the network-based application compliance data.

16. The computer system of claim 15, wherein the plurality of first vertices comprises a first vertex, the plurality of second vertices comprises a second vertex, and the plurality of third vertices comprises a third vertex, wherein the first vertex, the second vertex, and the third vertex are aligned on an axis, wherein a first distance between the first vertex and the second vertex is based on the first input, and wherein a second distance between the first vertex and the third vertex is based on a second input of the plurality of second inputs.

17. The computer system of claim 15, comprising an input device configured to supply the first input, a second input of the plurality of second inputs, or both, the input device comprising a mouse, a keyboard, a camera, an accelerometer, a touchscreen, a biometric reader, a clicker, a microphone, or any combination thereof.

18. The computer system of claim 15, wherein the plurality of network-based application compliance risk categories comprise at least one of an application security risk category, a data security risk category, an encryption risk category, an incident management risk category, a threat and vulnerability management risk category, or a vendor management risk category.

19. The computer system of claim 15, wherein a second input of the plurality of second inputs is sourced from an application programming interface.

* * * * *